United States Patent [19]

Steltenkamp

[11] Patent Number: 4,507,172

[45] Date of Patent: Mar. 26, 1985

[54] KRAFT PULPING PROCESS

[75] Inventor: Michael S. Steltenkamp, Pensacola, Fla.

[73] Assignee: St. Regis Paper Company, New York, N.Y.

[21] Appl. No.: 418,749

[22] Filed: Sep. 16, 1982

[51] Int. Cl.³ .............................................. D21C 11/12
[52] U.S. Cl. .................................. 162/30.11; 162/33; 162/35; 162/38; 162/82
[58] Field of Search ...................... 162/30.1, 30.11, 38, 162/82, 33, 35; 423/562

[56] References Cited

U.S. PATENT DOCUMENTS 3,216,887 11/1965 Landmark ............................. 162/38

FOREIGN PATENT DOCUMENTS 452910 11/1948 Canada ................................. 162/38

Primary Examiner—William F. Smith
Attorney, Agent, or Firm—Patrick J. Joyce

[57] ABSTRACT

A process of producing cooking liquor for addition to a digester for enhancement of the yield derived from kraft pulping of wood chips in which a portion of the black liquor is treated with lime under certain conditions and then reused as cooking liquor. The causticizing of the black liquor results in the generation of polysulfide ions and allows, through the formation of calcium-organo complexes, for the carryover of soluble calcium with the black liquor. The presence of calcium ions synergistically enhances the effectiveness of polysulfide such that the use of the new cooking liquor results in pulp yield increases of several percentage points for the same lignin content when compared to conventional kraft pulping.

17 Claims, 4 Drawing Figures

○ KRAFT + CAUSTICIZED BLACK LIQUOR
◐ KRAFT + BLACK LIQUOR FILL BACK
● KRAFT ALONE

○ KRAFT ALONE
◐ KRAFT / Ca 4,507,172

KRAFT PULPING PROCESS

BACKGROUND OF THE INVENTION

This invention relates to kraft pulping and in particular to the preparation of a cooking liquor which, compared to conventional kraft pulping liquor, provides an increase in pulp yield for a given degree of delignification.

In the conventional kraft pulping process, lignocellulosic materials, such as wood chips, are treated in a digester with a fresh cooking liquor (white liquor) consisting of an aqueous solution of sodium hydroxide and sodium sulfide under a certain set of conditions of temperature, pressure and time. Upon completion of the cooking schedule, the resulting pulp is washed to remove spent chemicals and dissolved wood substance. The washed pulp is screened and/or refined to remove or disperse undercooked material. The pulp is stored until drawn as required for the direct manufacture of paper products, or may be subjected to conventional bleaching treatment for the manufacture of bleached grades of paper.

The spent liquor from the pulping process is referred to as weak black liquor, which contains degraded and dissolved wood constituents and inorganic salts. This liquor is evaporated to a solids content of about 25% at which point the soaps, sodium salts of resin, and fatty acids are recovered. The strong, soap-free black liquor is further evaporated then combusted in a recovery furnace. The resulting molten mass of sodium carbonate and sodium sulfide is dissolved in water to give a "green liquor" which is treated with calcium hydroxide to convert the carbonate into hydroxide. This causticizing process regenerates a white liquor for reuse in cooking. A portion of the weak black liquor may be used to adjust the volume and concentration of the cooking liquor.

The objective of the pulping process is to chemically degrade and dissolve the lignin matrix, while preserving the carbohydrate fraction. Lignin is a high molecular weight polymer which gives wood its structural rigidity by holding the cellulose fibers together. During the course of delignification in kraft pulping, other components of the fibrous raw material are dissolved to a degree determined by the process conditions. Ideally, pulping should be conducted in a way which dissolves lignin selectively, with no dissolution or degradation of cellulose or other carbohydrate materials. There is no process which achieves this total objective.

A number of chemical additives and modifications of the pulping liquor composition have been used in the art which achieve some degree of pulp yield enhancement. In any discussion of pulp yield improvement, it should be remembered that the objective is to increase the yield of components other than lignin. It is entirely possible and common practice to increase yield by terminating the pulping reactions at an earlier stage, thus retaining more of the starting material including lignin. Yield improvement via this method involves a trade-off between yield and product quality. In practice, for any end product, there is a limiting residual lignin content above which product quality becomes unacceptable.

Among the additives and modifications in the art which have achieved higher yields at equal lignin content are hydrogen sulfide pretreatment, anthraquinone and other related quinone derivatives, and polysulfide. The use of polysulfides in the kraft pulping process is well known. A number of publications indicate that kraft pulping with sodium polysulfide provides a considerable increase in pulp yield for a given lignin content. Polysulfides catalyze the oxidation of the carbohydrates' aldehyde end-groups to form a series of aldonic acids which retard the "peeling reaction" by which carbohydrates are degraded and dissolved. Calcium-polysulfide solutions have been found to be more effective in stabilizing the carbohydrates toward alkaline degradation than the corresponding sodium-polysulfide solutions as a result of the ability of calcium ions to catalyze the formation of more alkali-stable aldonic acids.

Despite the discovery of the yield-enhancing ability of polysulfides in kraft cooking liquors, their use in kraft pulping did not gain wide acceptance in the industry since the polysulfide that must be added or generated in situ by addition of elemental sulfur, could not be recovered as such in the conventional kraft recovery system. Polysulfide is converted to its reduced form as sulfide during pulping and the feasability of regenerating polysulfide through sulfur addition is limited by the sulfur losses that would occur in the system. More recently, much interest has been generated in the use of various oxidants which allow for the formation of polysulfide through the oxidation of sodium sulfide in kraft white liquor. Among the oxidation systems developed is Mead's liquor oxidation system in which sodium sulfide is oxidized by molecular oxygen in the presence of a catalyst consisting of a granular activated carbon treated with a wet proofing agent. While this process results in the generation of polysulfide and its recovery from kraft spent liquors, operating and capital costs have been among the factors limiting its acceptance in the industry.

Degraded wood components, such as in black liquor, can also be effective as oxidation catalysts. The air-oxidation of white liquor/black liquor mixtures has been shown to generate small levels of polysulfide. The direct oxidation of cooking liquors consisting of white liquor/black liquor mixtures in the digester while in contact with the wood can lead to increased yields using moderate sulfur levels. However, the yield increases so obtained are quite small due to low levels of polysulfide formed.

Canadian Pat. No. 452910 is directed to a soda or sulphate process of pulping a batch of cereal straw wherein weak black liquor from pulping of wood is causticized with lime and then is used for cooking the straw. The interest of the patentee in the causticization of weak black liquor arises because of the economics associated with the conventional method of recovering chemicals from very dilute liquors. The pulping of bulky materials, such as straw or grasses, require much lower chemical applications than for the pulping of wood chips, so the resulting black liquors are very dilute. Thus the causticization of black liquor represents an economically attractive alternative to the conventional method for recovering chemicals. The pulping of wood chips was not included in the patentee's concept. In the examples presented, particularly example 3, no change in the sodium sulphide concentration occurred as a result of causticization, which strongly suggests that polysulfide was not generated in the system. In contrast, the present invention provides for causticization of the black liquor under conditions which involve the air oxidation of sodium sulfide to generate polysulfides. Since the presence of polysulfide is required to produce yield enhancing effect, no yield increase would be obtained from the patentee's system.

In Australian Pat. No. 225156, a cooking liquor for use in producing pulp from grasses by the soda process is obtained by regenerating and reusing the waste digestion liquor by the direct addition of lime thereto. Since it is chemically impossible to generate in situ polysulfides from the waste digestion liquor of the soda process, no yield increase could be obtained from the Australian system.

SUMMARY OF THE INVENTION

It is the primary object of the present invention to provide an improved process for the enhancement of pulp yield in kraft pulping. This process improvement comprises either: causticizing a portion of the black liquor for mixing with conventional kraft white liquor in the preparation of the final cooking liquor; or causticizing mixtures of black liquor and green liquor for subsequent use as cooking liquor. It is a further object of the invention to provide a new cooking liquor which comprises a mixture of causticized white and black liquors.

More particularly, the present invention describes a modification of the kraft pulping and recovery system in which black liquor is treated separately or in mixture with green liquor with calcium oxide to generate a cooking liquor which, when compared to kraft white liquor, results in increased pulp yields per given lignin content. The increased yields resulting from the use of this cooking liquor is due to the presence of small but significant levels of polysulfide which catalyze a stabilization of carbohydrates toward alkaline degradation, and to the presence of solubilized calcium which synergistically enhances the effectiveness of polysulfides in this stabilization.

These and other related objects will become clear upon review of the following specification of the invention and of the several specific examples of embodiments of the invention and the data and results and conclusions derived therefrom.

Several figures of drawings will be employed to further illustrate the process modification which has led to the improved result. Reference will be made to these figures during the course of the general presentation of the basic concept of the invention which will key into the working examples of the new process.

DESCRIPTION OF THE PREFERRED EMBODIMENTS

Figure 1:
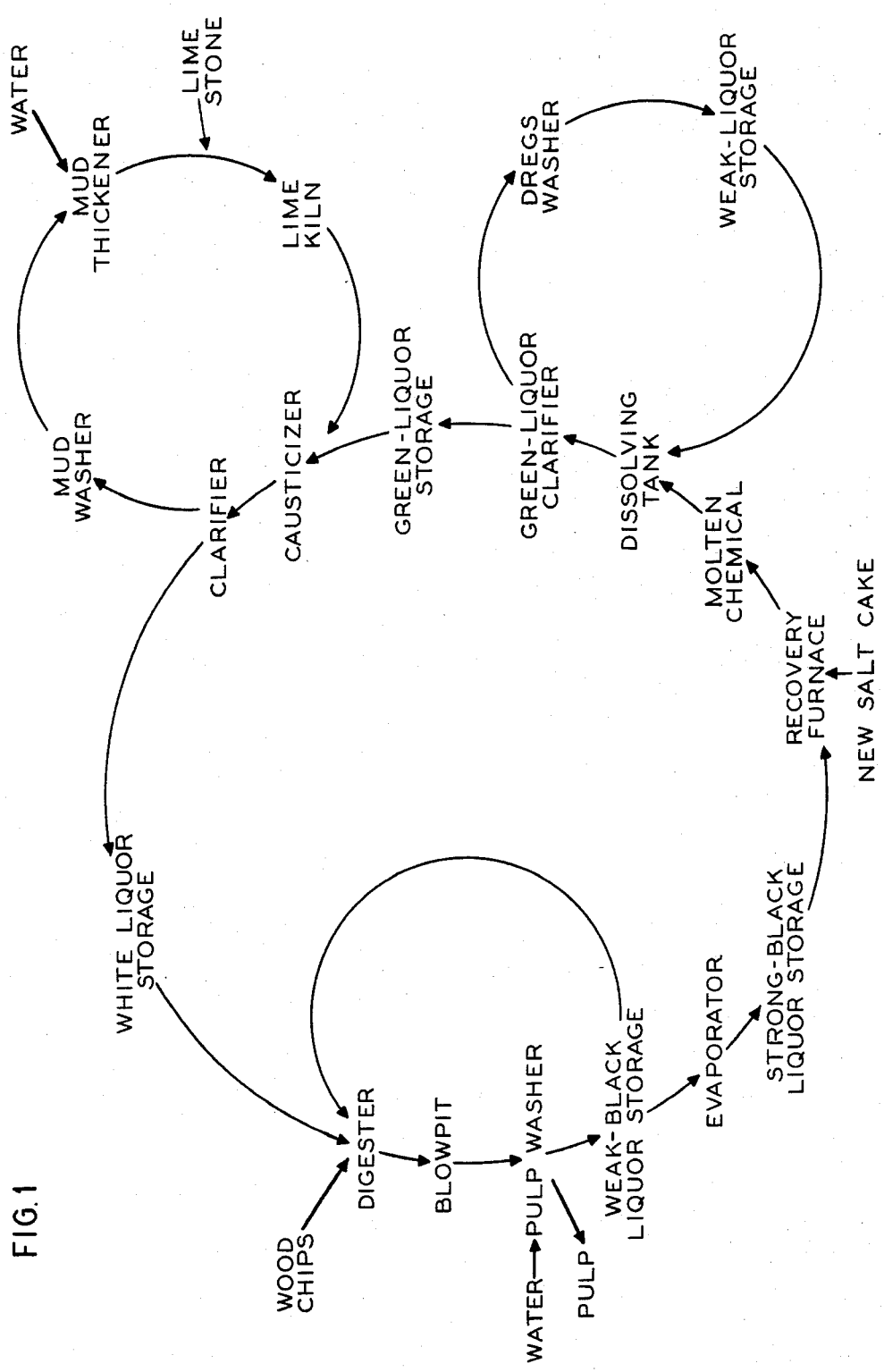
FIG. 1 is a simplified diagram which illustrates the cylic nature of the conventional kraft recovery process.

In the conventional practice of the kraft process as shown in FIG. 1, wood chips are charged into a digester, where they are cooked under pressure with steam in an aqueous digestion solution of sodium hydroxide and sodium sulfide, known as "cooking liquor". In the cooking operation the lignin binder, which holds together the cellulose fibers of the wood, is dissolved.

The spent cooking liquor containing the lignin dissolved from the wood is called "black liquor". As the dilute black liquor (about 15% dissolved solids) comes from the washers, it is concentrated in multiple-effect evaporators by the use of steam.

The concentrated black liquor then goes to the mixing tank, where salt cake (sodium sulfate) is mixed with the liquor to make up the chemical losses in the cycle. The concentrated black liquor, with its salt cake burden, is pumped to a recovery furnace where it is fired.

In the recovery furnace, heat is obtained from the combustion of the organic liquor constituents (dissolved from the wood), and, equally important, the inorganic constituents (sodium salts) in the liquor are recovered as molten ash or smelt. Another essential function of the recovery furnace is the reduction of the sodium sulfate content of the black liquor to sodium sulfide.

The smelt, composed largely of sodium carbonate, $Na_2CO_3$, and sodium sulfide, $Na_2S$, is tapped from the furnace and dissolved in water in the dissolving tank to form "green liquor". The green liquor is then subjected to a causticizing treatment with lime, CaO, to convert the sodium carbonate to sodium hydroxide. In this step, the sodium sulfide remains unchanged. The liquor, now known as "white liquor", is then ready for reuse as cooking liquor in the digester. The calcium carbonate sludge reclaimed from the white liquor in the causticizing operation is reburned in a lime kiln, with loss of $CO_2$, to yield calcium oxide, which is reused in causticizing green liquor to white liquor.

The white liquor produced by the recovery system is mixed with some black liquor (10 to 50%), known as "black liquor fillback", before being charged to the digester. Black liquor is used to attain the required liquor-to-wood ratio without adding additional water.

The modification which comprises the present invention involves the diversion of a portion of the black liquor as it flows through the evaporator system for treatment with a suspension of calcium hydroxide or an equivalent calcium donating salt or base for subsequent use as cooking liquor.

Most evaporators are now so arranged that black liquor is withdrawn from the effect where the concentration is such that maximum soap recovery is obtained. This is generally at a point in the evaporator system where the liquor concentration is about 25 to 28% total solids and at a temperature of 160° to 180° F. The liquor is removed to settling tanks, and the soap is skimmed off and sent to the tall oil plant. The skimmed hot liquor is returned to the evaporator system. In accordance with the invention, a portion of the skimmed hot liquor is diverted from the conventional recovery system for causticizing and subsequent use as cooking liquor. While a black liquor corresponding to a 25% total solids content was utilized in the example that follows because it represents the liquor following soap skimming, a weaker or stronger liquor may be used in the practice of the invention.

Figure 2:
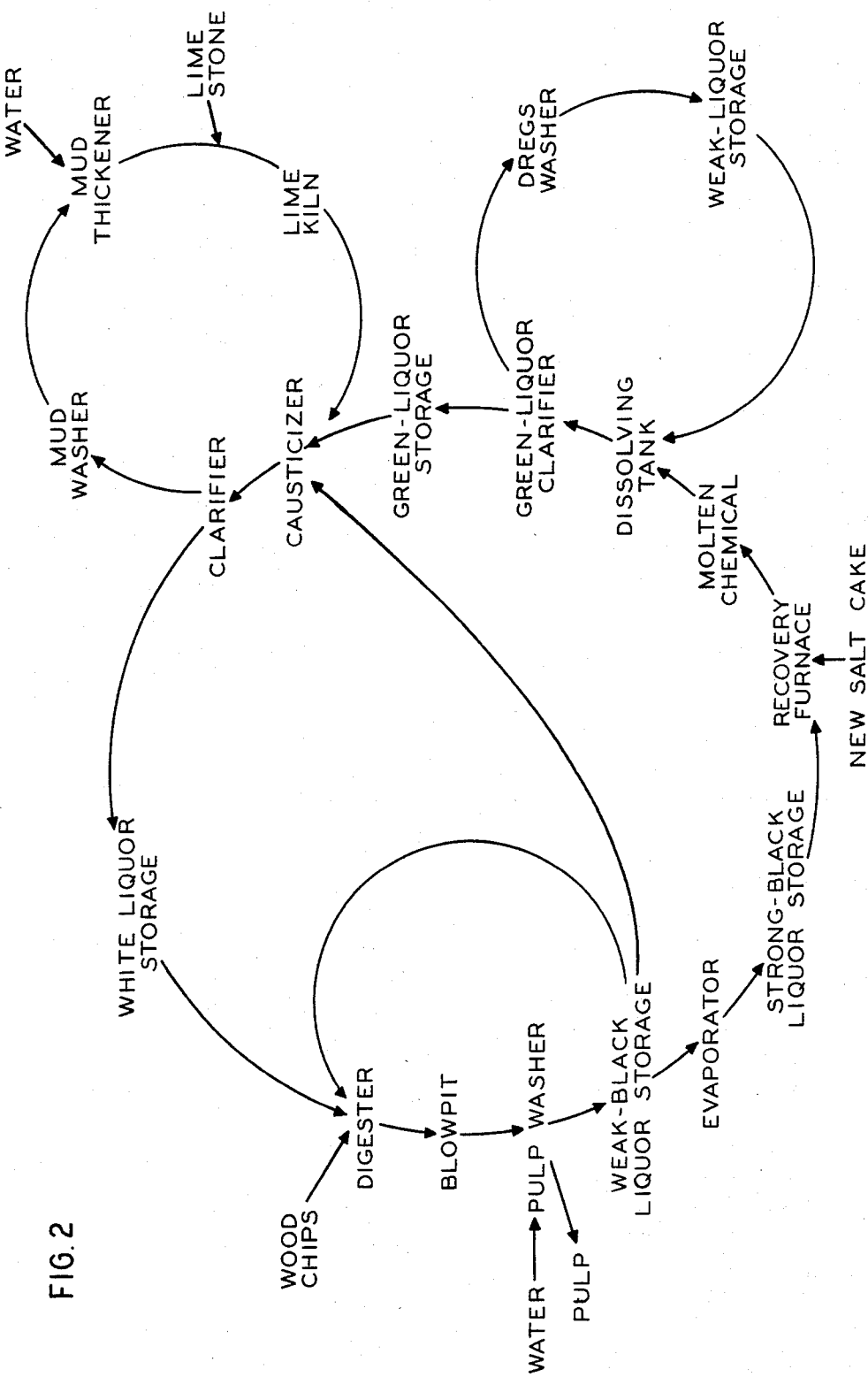
FIG. 2 is a diagram showing the kraft recovery process modified in accordance with the invention.

As shown in FIG. 2, the diverted hot liquor may be treated by (1) causticizing it for mixing with conventional kraft white liquor in preparation of the final cooking liquor, or (2) causticizing mixtures of the diverted liquor and green liquor for subsequent use as cooking liquor. Preferably, causticization is carried out by adding lime (CaO) in an amount corresponding to a molar ratio of 1.5:1 of lime to sodium carbonate. For the causticization of black liquor alone, this ratio is not critical and may vary from 0.5 to 2 without significantly altering the composition of the resulting liquor. For the causticization of black liquor-green liquor mixtures where the concentration of sodium carbonate is considerably higher, a ratio of 1.5-2 becomes the preferred range since a high degree of efficiency in the conversion of sodium carbonate to sodium hydroxide is required for the preparation of an alkaline cooking liquor. By causticizing black liquor or black liquor-green liquor mixtures using a 1.5:1 molar ratio of CaO to $Na_2CO_3$, small but significant amounts of polysulfide ions are generated. The formation of polysulfide is attributed to a partial air-oxidation of sodium sulfide that occurs under conditions typical of that existing during causticization. The amount of polysulfide formed is dependent on both the concentration of sodium sulfide present and on the extent of air-oxidation. In addition to the catalytic role that the black liquor organics have in the oxidation of sulfide to polysulfide, these organics also act to solubilize calcium ions through formation of calcium-organo complexes. The concentration of both polysulfide and calcium ions thus introduced into the cooking liquor by admixing portions of causticized black liquor with kraft white liquor, or by causticizing black liquor-green liquor mixtures, is sufficient to provide for pulp yield increases of several percent. The amounts of black liquor to be diverted from the conventional recovery process and causticized separately or with green liquor are not narrowly critical and can range, for example, between about 5 and 50% of the total volume of cooking liquor. There is no upper limit or lower limit on the amount of causticized black liquor to be employed, but as a practical matter the point of diminishing returns is reached when the indicated limits are exceeded. With respect to the lower limit, there should be sufficient quantities of polysulfide ions and calcium ions to provide an increase in yield sufficient to warrant the process modification. With causticized black liquor representing 5-50% of the total cooking-liquor volume, the amount of polysulfide and calcium ions available in the final cooking liquor may range from 0.1%-1.0% and 0.05-1.0% respectively, as a percent on O.D. wood. These lower levels should be adequate to improve pulp yield. Operating and mechanical problems, such as foaming, would set the practical upper limit.

The yield-enhancing effect associated with the new cooking liquor is attributed to the combined presence of both polysulfide and calcium ion. Polysulfide catalyzes the oxidation of the carbohydrates' reducing end-groups to form a series of aldonic acids which stabilizes the carbohydrates' from alkaline degradation. These aldonic acids vary in alkali-stability, some of which can break down during pulping, thereby reexposing the reducing end-groups to alkaline degradation. The presence of calcium ions in a polysulfide process, catalyzes the formation of more alkali stable aldonic acids. Literature findings have shown that glucosone, considered to be an intermediate in the polysulfide oxidation of glucose, when treated with calcium hydroxide is converted primarily to mannonic acid, while treatment with sodium hydroxide gives primarily arabinonic and erythronic acids. This ability of calcium to favor the formation of aldonic acids of higher alkali stability is thus believed to be responsible for the additional yield increase since the stabilization of the carbohydrates by polysulfide is enhanced. Thus, despite the low levels of polysulfide present, the presence of solubilized calcium ions allow for yield increases of several percent by synergistically enhancing the effectiveness of polysulfide.

The process improvement which comprises this invention is further illustrated by reference to the specific example described below and to the attached Table and Figures.

EXAMPLE

A soap-skimmed black liquor of 25% solids content was obtained from a kraft pulping operation which employed a wood furnish consisting of Southern pine. The composition of the black liquor consisted of:

| | |
|---|---|
| total inorganic carbon (TIC) | 3.0 gpl |
| *total organic carbon (TOC) | 94.0 gpl |
| NaOH as $Na_2O$ | 5.3 gpl |
| $Na_2S$ as $Na_2O$ | 10.7 gpl |
| Polysulfide ($Na_2S_x$) | 0 |
| Calcium ($Ca^{++}$) | trace ($\leq 0.1$ gpl) |

*TOC is generally higher than for starting black liquor due to evaporation losses.

170 liters (~45 gallons) of black liquor was causticized in a 55-gallon drum using 3570 g (7.86 lbs) of lime. The amount of lime employed represents a 50% excess of that theoretically required for causticization (equal molar amounts of CaO and $Na_2CO_3$).

Lime was added to the black liquor during the course of heating it to a temperature of 210° F. The temperature was maintained at 210° F. for 2½ hours with vigorous stirring in an open-air atmosphere. Then the causticized black liquor was allowed to settle overnight (~18 hours), after which it was separated from the mud and then stored under a nitrogen atmosphere until used in pulping. The composition of a freshly prepared sample was:

| | |
|---|---|
| total inorganic carbon | <1 gpl |
| *total organic carbon | 98 gpl |
| NaOH as $Na_2O$ | 19.8 gpl |
| $Na_2S$ as $Na_2O$ | 8.4 gpl |
| Polysulfide ($Na_2S_x$) | 0.66 gpl |
| Calcium ($Ca^{++}$) | 1.36 gpl |

*same as above

A Southern pine wood furnish was screened and blended. Chips greater than 1⅛" and less than 3/16" were rejected. 17,000 wet grams of wood, with a moisture content of 48.62%, was loaded into a 2½ ft³ tumbling digester. To the digester was added: 22.5 liters of causticized black liquor and 14.2 liters of white liquor having an active alkali concentration of 60 gpl and a sulfidity of 29%. Taking into account wood moisture, the total liquor volume was 45 liters which corresponded to a liquor to wood ratio of 5.2:1. Causticized black liquor thus constituted 50% v/v of the total cooking liquor. The composition of the liquor and its percent application on wood was:

| | | |
|---|---|---|
| NaOH as Na₂O | 1050 g, | 12% |
| Na₂S as Na₂O | 437 g, | 5% |
| Active Alkali as Na₂O | 1487 g, | 17% |
| Polysulfide | 0.33 gpl, | 0.17% |
| Calcium (as Ca$^{++}$) | 0.68 gpl, | 0.35% |

The digester was heated to a temperature of 344° F. in 60 minutes then held at that temperature for a predetermined length of time. The time at temperature was varied and was dependent upon the target kappa. Upon completion of the cooking schedule, the softened wood chips were blown from the digester and into a blow tank and the pulp then thoroughly washed.

Figure 3:
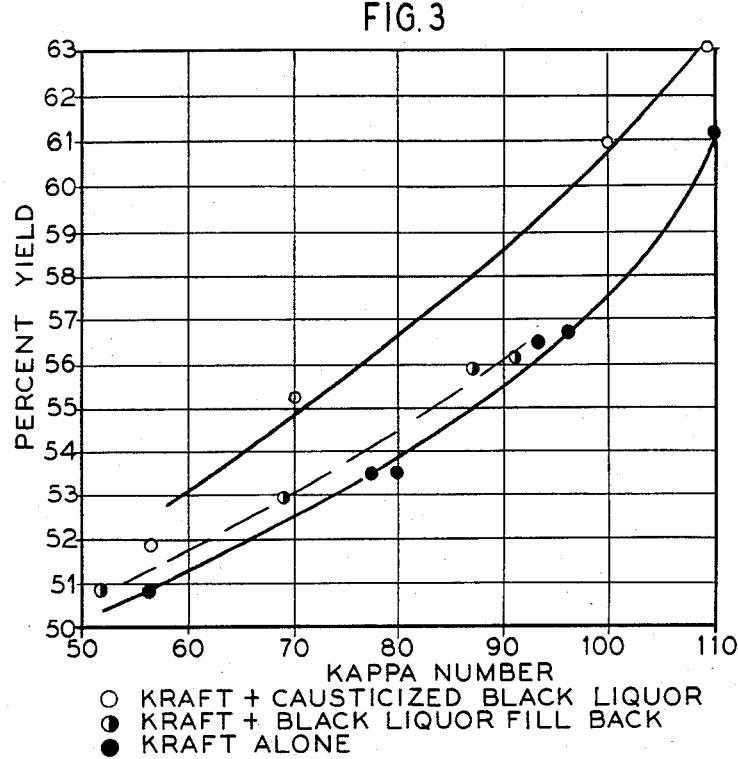
FIG. 3 is a graph showing the effect on kappa-yield relationship in the kraft pulping process (a) with causticization of a portion of the black liquor, (b) with black liquor fillback and without causticizing the black liquor, and (c) without fillback and without causticizing the black liquor.
Figure 4:
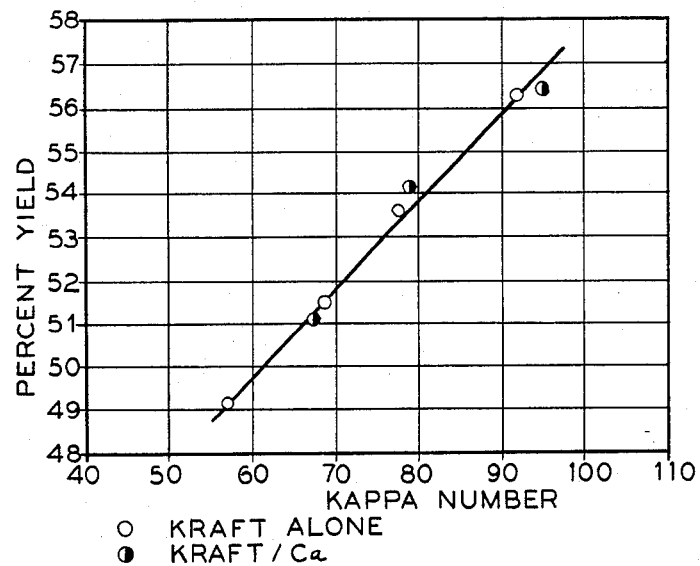
FIG. 4 is a graph showing the effect on kappa-yield relationship by the addition of calcium hydroxide to the digester in the kraft pulping process in the absence in the digester of black liquor, causticized black liquor and polysulfides.

In this case, when compared to a control cook where no causticized black liquor was employed, a pulp yield improvement of 1-3% was obtained over a kappa range of 50-100. The pulping conditions and the pulp yield results are presented in the following Table I. The increase in pulp yield obtained as a result of the illustrated modification of the kraft process as depicted in this example is shown in FIG. 3. In FIG. 3 it can be seen that, for example, at a kappa value of 90 the curve for the causticized black liquor indicates a very substantial percentage yield improvement, about 2½ percent increase, over a comparable run in which the same quantity of black liquor was added as fillback into the digester. The same run of a kraft digestion without black liquor fillback and without causticized black liquor falls 3 percent behind in yield.

FIG. 2 illustrates the effect of calcium hydroxide addition to a kraft process in the absence of black liquor, causticized black liquor and polysulfides. No effect on pulp yields per given lignin content was observed. This, when coupled with the well-documented effects of polysulfide (as % on O.D. wood) on pulp yields, demonstrates that calcium synergistically enhances the yield-enhancing ability of polysulfide.

While the preceding description serves to illustrate the present invention, the definition of its scope may be obtained only by reference to the following claims.

TABLE 1

Pulping Data

I. Cooking Liquors

| | Causticized Black Liquor | Kraft + Black Liquor | Kraft |
|---|---|---|---|
| TIC | 0.258 gpl | 0.927 gpl | 0.09 gpl |
| TOC | 21.8 gpl | 22.1 gpl | <0.01 gpl |
| Sx | 0.33 gpl | 0 | — |
| Ca$^{++}$ | 0.66 gpl | 0.01 gpl | — |
| % Sulfidity | 29 | 29 | 25 |

II. Pulping Conditions and Results

| | Cook Type | Cook # | Temp c | Time up/at | % AA | % Yield | KAPPA |
|---|---|---|---|---|---|---|---|
| | Causticized | T-1865 | <173 | 60/20 | 17 | 63.2 | 109 |
| | Black Liquor | T-1863 | 173 | 60/35 | 17 | 55.3 | 70.3 |
| | | T-1864 | 173 | 60/50 | 17 | 51.8 | 56.8 |
| | | T-1881 | 173 | 60/20 | 17 | 60.9 | 99.8 |
| FIG. 1 | Kraft + | T-1907 | 173 | 60/50 | 17 | 50.9 | 51.8 |
| | Black Liquor | T-1908 | 173 | 60/35 | 17 | 53.0 | 69.5 |
| | | T-1910 | 173 | 60/20 | 17 | 56.2 | 91.3 |
| | | T-1911 | 173 | 60/25 | 17 | 56.0 | 87.4 |
| | Kraft | T-1868 | 173 | 60/20 | 17 | 56.4 | 93.4 |
| | | T-1866 | 173 | 60/35 | 17 | 53.6 | 78.0 |
| | | T-1867 | 173 | 60/50 | 17 | 50.9 | 56.7 |
| | | T-1912 | 171 | 60/40 | 17 | 53.5 | 80.3 |
| | | T-1913 | 171 | 60/25 | 17 | 56.7 | 96.0 |
| | | T-1914 | 171 | 60/20 | 17 | 61.3 | 109.4 |
| FIG. 2 | Kraft | T-2089 | 173 | 60/30 | 17 | 51.4 | 68.5 |
| | | T-2098 | 173 | 60/25 | 17 | 53.5 | 77.3 |
| | | T-2105 | 173 | 60/34 | 17 | 49.2 | 56.9 |
| | | T-2110 | 173 | 60/30 | 15 | 56.2 | 92.0 |
| | Kraft/Ca | T-2115 | 173 | 60/30 | 15 | 56.4 | 94.8 |
| | | T-2116 | 173 | 60/40 | 15 | 54.1 | 78.9 |
| | | T-2124 | 173 | 60/50 | 15 | 51.1 | 67.4 |

I claim:

1. In the process of producing kraft cooking liquor for addition to a digester for enhancement of the yield derived from kraft pulping of wood chips in which black liquor obtained from washing digested pulp is concentrated and burned, the resulting smelt is dissolved in water and the resulting green liquor is causticized with a calcium salt to produce a white liquor for use in digestion, the steps of treating at least a part of the black liquor by the direct addition thereto of a calcium salt or base in the presence of air to generate solublized calcium ions and, polysulfide ions in an amount sufficient to increase the pulp yield, and returning the treated black liquor to the digester.

2. The process of claim 1, which further comprises the step of recycling another part of the black liquor to the digester to adjust the volume and concentration of the cooking liquor.

3. The process of claim 1 wherein the black liquor regeneration step comprises mixing at least a portion of the black liquor with the green liquor and treating the resulting mixture by the direct addition thereto of a calcium salt or base in the presence of air to generate solublized calcium ions and polysulfide ions in an amount sufficient to increase the pulp yield, and returning the treated liquor to the digester.

4. The process of claim 1 in which the treated black liquor constitutes 5-50% of the total volume of cooking liquor.

5. The process of claim 4 in which the treated black liquor has a solids content ranging from 5-30%.

6. The process of claim 1 in which the calcium salt is lime.

7. The process of claim 6 in which the quantity of lime corresponds to a molar ratio of 0.5–2:1 of line to sodium carbonate.

8. The process of claim 3 in which the calcium salt is lime and the quantity of lime corresponds to a molar ratio of 1.5–2:1 of lime to sodium carbonate.

9. The process of claim 7 or 8 in which the quantity of lime corresponds to a molar ratio of 1.5:1 of lime to sodium carbonate.

10. The process of claim 1 in which the cooking liquor comprises a mixture of white liquor and treated black liquor.

11. A process according to claim 1 wherein the amount of solublized calcium ions added is sufficient to generate a calcium ion content in the digester cooking liquor of at least 0.05 percent based on O.D. wood.

12. A process according to claim 11 wherein the amount of solublized calcium ions added is sufficient to generate a calcium ion content in the digester cooking liquor or from 0.05 percent to 1.0 percent based on O.D. wood.

13. A process according to claim 1 wherein the amount of polysulfide ions and solublized calcium ions present range from 0.1 to 1.0 percent and 0.05 to 1.0 percent respectively as a percent based on O.D. wood.

14. An improved kraft cooking liquor for digestion of wood chips which comprises a mixture of a white pulping liquor and a black liquor treated according to the method of claim 1 to provide polysulfide and calcium ions.

15. The cooking liquor of claim 14 wherein the black liquor is a causticized black liquor.

16. The cooking liquor of claim 15 wherein the black liquor has a solids content ranging from 5–30%.

17. An improved kraft cooking liquor according to claim 14 wherein the amount of polysulfide ions present range from 0.1 percent to 1.0 percent and the amount of solublized calcium ions present comprise at least 0.05 percent based on O.D. wood content.

* * * * *